United States Patent
Adams et al.

[11] Patent Number: 5,346,010
[45] Date of Patent: Sep. 13, 1994

[54] PRECIPITATION OF SCALE INHIBITORS IN SUBTERRANEAN FORMATIONS

[75] Inventors: Gerald C. Adams, Sugar Land; Robert J. Faircloth; Jimmie B. Lawson, both of Houston, all of Tex.

[73] Assignee: Shell Oil Company, Houston, Tex.

[21] Appl. No.: 40,784

[22] Filed: Mar. 31, 1993

[51] Int. Cl.$^5$ .................. E21B 43/12; E21B 43/22
[52] U.S. Cl. .................. 166/279; 166/300; 252/8.552; 252/8.553
[58] Field of Search .............. 166/279, 300, 310, 371; 252/8.552

[56] References Cited

U.S. PATENT DOCUMENTS

| | | | |
|---|---|---|---|
| 3,483,925 | 12/1969 | Slyker et al. | 166/279 |
| 3,633,672 | 1/1972 | Smith et al. | 166/279 |
| 3,654,993 | 4/1972 | Smith et al. | 166/279 |
| 3,704,750 | 12/1972 | Miles et al. | 166/279 |
| 4,357,248 | 11/1982 | Berkshire et al. | 166/279 X |
| 4,393,938 | 7/1983 | Lawson et al. | 166/279 |
| 4,495,996 | 1/1985 | Meyers et al. | 166/279 |
| 4,633,949 | 1/1987 | Crowe | 166/279 |
| 4,860,829 | 8/1989 | Carlberg et al. | 166/279 |
| 4,947,934 | 8/1990 | Hen | 166/279 |
| 5,002,126 | 3/1991 | Carlberg et al. | 166/279 |
| 5,141,655 | 8/1992 | Hen | 166/279 X |
| 5,211,237 | 5/1993 | Faircloth et al. | 166/279 |

*Primary Examiner*—George A. Suchfield
*Attorney, Agent, or Firm*—Del S. Christensen

[57] ABSTRACT

Scale inhibitors are precipitated in a formation by injection in an acidic solution comprising a base generating component and a chelating agent. The inhibitor is preferably a calcium salt of an organic phosphonate. The chelating agent prevents iron ions from causing premature hydrolysis of the base generating component.

17 Claims, 1 Drawing Sheet

PRECIPITATION OF SCALE INHIBITORS IN SUBTERRANEAN FORMATIONS

FIELD OF THE INVENTION

This invention relates to wellbore and near wellbore formation scale inhibitor compositions.

BACKGROUND OF THE INVENTION

Slightly soluble inorganic salts, for example calcium carbonate, calcium sulfate, and barium sulfate, often precipitate from waters produced along with oil and gas. Such precipitation occurs because conditions that affect solubility, for example temperature and pressure, change, or because incompatible waters mix in, or near, producing well bores. Precipitates of slightly soluble salts are often called scale. Scale build up often occurs within the near wellbore formation and the wellbore equipment. Scale buildup within the formation decreases permeability and impairs well productivity. Scale build-up within wellbore equipment shortens equipment useful life and can plug production tubing.

To minimize scaling, scale inhibitors can be placed within the formation by "squeeze" methods. Squeezing involves injecting the inhibitor and, usually, overflushing the treated zone with water or brine. The well is then placed back into production. Inhibitor in the produced waters protects the wellbore and downhole equipment from scale build-up.

Squeezing inhibitor into the formation is typically a preferred way to apply an inhibitor. Squeeze injection eliminates any need for continuous injection, and the formation in the vicinity of the wellbore is protected. Most common scale inhibitors are effective in concentrations greater than about 1 to 100 parts per million. In a normal squeeze placement, it is difficult to control the concentration of inhibitor returning in produced brines. The inhibitors tend to be produced quickly, with concentrations quickly tailing off to ineffective amounts. This results in frequent shutdowns of production for squeezing operations, and also in excessive chemical costs.

Various attempts to control and delay inhibitor production have been only partially successful. For example, U.S. Pat. No. 3,483,925 discloses a method to provide a more gradual return of inhibitor by injection of the inhibitor with polymer-thickened slugs of solution. Injection of such thickened solutions would inhibit production of all fluids from the wellbore, and is therefore not a desirable method to provide a more gradual return of the inhibitor when production from the wellbore is desired.

U.S. Pat. Nos. 3,633,672 and 3,704,750 discloses inhibitors which are only slightly soluble in neutral or basic solutions and soluble in acidic solutions. These inhibitors are squeezed into the formation in an acidic solution, and then dilution with formation brine and reaction with reservoir rock within the formation raises the solution pH and causes precipitation of the inhibitor. The inhibitor is then produced gradually due to a slight solubility in formation brine. This method solves many of the problems with squeeze placement of scale inhibitors, but due to plug flow into the formation and then back with production, much of the inhibitor is not precipitated into the formation within a reasonable amount of time. Further, placement of the precipitate is poorly controlled and not predictable.

U.S. Pat. No. 4,357,248 discloses an improvement to processes such as those disclosed in U.S. Pat. Nos. 3,633,672 and 3,704,750. Patent '248 discloses injection of a scale inhibitor in a form which is soluble in a high pH aqueous solution and insoluble in neutral or low pH solutions. The solution further comprises a compound that hydrolyzes to form acidic compounds at a rate which causes the inhibitor to precipitate in the formation without the need for mixing with formation brines or reaction with formation rocks. This method, in spite of its advantages, has not been widely practiced because of difficulty in handling the useful pH lowering materials.

U.S. Pat. No. 4,860,829 discloses a method to precipitate calcium salts of phosphonate scale inhibitors in formations wherein the calcium is injected complexed with a chelate, along with a phosphonate scale inhibitor in the form of a sodium salt. The calcium is gradually released by the chelating agent and causes the phosphonate scale inhibitor to precipitate as a calcium salt. With this method of precipitating the scale inhibitor in the formation, precipitation begins once sufficient calcium is released from the chelating agent to saturate the solution with the calcium salt of the scale inhibitor. Equilibrium levels of the calcium salt of the scale inhibitor and chelate are readily determined, although the rate at which that equilibrium is reached is not easily determined and is dependent upon many variables.

U.S. Pat. Nos. 5,141,655 and 5,211,237 disclose scale inhibitor compositions and methods to place scale inhibitors in subterranean formation. The scale inhibitors are injected in an acidic solution, and the pH of the acidic solution is raised within the formation by a heat sensitive pH raising substance. The heat sensitive pH raising substance raises the pH of the inhibitor solution within the formation. The solubility of the scale inhibitor at the higher pH is significantly reduced. The scale inhibitor therefore precipitates within the formation as a calcium salt when the pH of the composition increases. Amides and ureas are known heat-sensitive pH raising components. A shortcoming of this method is that the reaction wherein high pH components are produced from the precursors is sensitive to the presence of catalysts such as iron ions. Iron ions are present in abundance in most wellbore and production tubing environments. These iron ions accelerate the hydrolysis of amides and ureas to such an extent that the pH of the inhibitor solution is raised, causing precipitation of the scale inhibitor before the inhibitor is placed in the formation.

A need therefore remains in the art for a scale inhibitor injection method wherein the scale inhibitor can be squeeze injected into a formation as a solution and then precipitated within the formation.

It is therefore an object of the present invention to provide a method to inhibit scale formation using a squeeze method wherein the inhibitor is injected as an aqueous solution from which the inhibitor precipitates. It is a further object to provide such a method which does not require the use of chemicals which are difficult to safely handle. It is yet a further object to provide such a method wherein initial precipitation of the scale inhibitor is delayed until after a time period sufficient for squeeze injection into a subterranean formation.

SUMMARY OF THE INVENTION

These and other objects are accomplished by a process to emplace a scale inhibitor within a brine containing subterranean formation in the vicinity of a producing wellbore comprising:

providing an acidic aqueous solution comprising a dissolved scale inhibitor and a metal cation which combination is slightly soluble in the formation brine, a precursor which is capable of reacting within the formation to become a basic component and a chelating agent in an amount effective to prevent decomposition of the precursor upon contact with steel tubulars;

injecting the acidic aqueous solution into the formation through the wellbore; and producing formation fluids from the wellbore after the precursor has generated an amount of basic material sufficient to cause an amount of the scale inhibitor and metal cation to precipitate within the formation that is effective to provide scale inhibition.

The precipitated metal salt of scale inhibitor dissolves in produced brines to provide a concentration of inhibitor that effectively delays scale formation, but is not wastefully high.

The chelating agent prevents iron ions present within the wellbore from causing premature hydrolysis of the precursor and precipitation of the scale inhibitor before it has had time to be transported into the formation. A particularly preferred chelating agent is ethylenediaminetetraacetic acid (EDTA). This chelating agent is commercially available, and is effective in the present invention in reasonable concentrations.

Preferred precursors include common and easily handled materials such as urea(carbamide), formamide, and dimethyl formamide. Preferred inhibitors include nitrogen containing phosphonate scale inhibiting compounds such as nitrilotri-(methylene phosphonic acid), and diethylenetriaminepenta(methylene phosphonic acid).

DETAILED DESCRIPTION OF THE INVENTION

Figure 1:
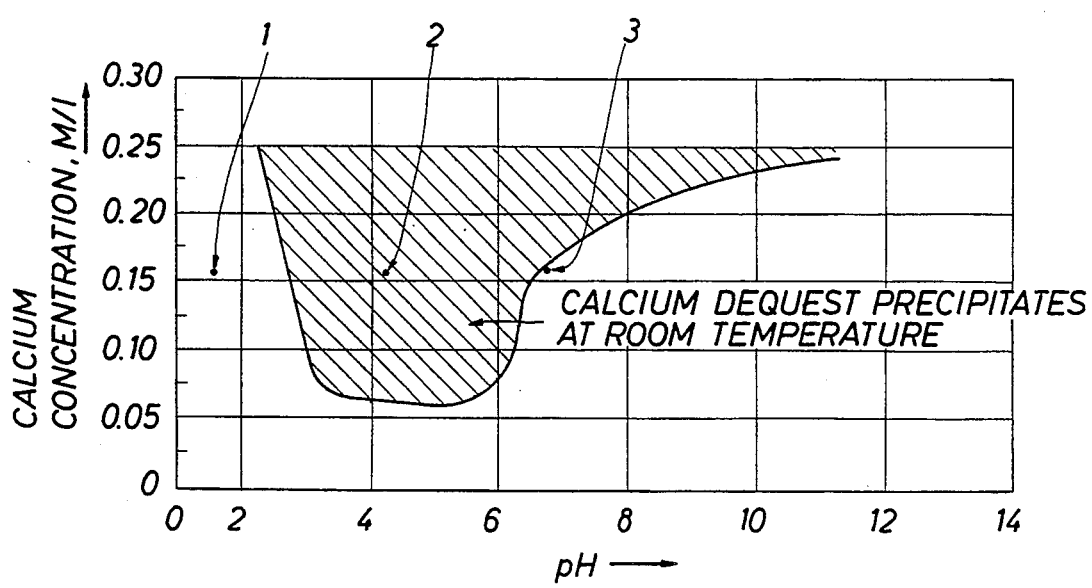
FIG. 1 is a plot showing combination of calcium ion and pH that results in precipitation of a scale inhibitor.

Chelating agents that are well known and chelating agents generally known to be useful are acceptable in the present invention. Generally, concentrations in the range of about 0.001 to about 0.05 moles per liter of solution are acceptable and effective. Chelating agents may be selected from, but are not limited to, the following:

Nitroacetic Acid
Salicylic Acid
2-Hydroxybutyric Acid
4-Sulfoaniline Diacetic Acid
Lactic Acid
Glycolic Acid
Glyceric Acid
Gluconic Acid
Glyclglycine
β-Alanine
3-Sulfoaniline Diacetic Acid
4-Aminobenzoic Acid-N,N-Diacetic Acid
Adenosine Phosphate
Glycine
3-Aminobenzoic Acid-N,N-Diacetic Acid
Serine
Tyrosine
Aniline Diacetic Acid
N-Butylethylenediamine-Triacetic Acid
Aspartic Acid
Glutamic Acid
N-Cyclohexylethylenediamine-Triacetic Acid
N,N-Ethylenebis(2(o-Hydroxyphenyl)) Glycine
Tartaric Acid
Malic Acid
β-(N-Trimethylammonium) Ethylimino Diacetic Acid
Disodium 1,2-Dihydroxybenzene-3,5-Sulfonate
Imino-Diacetic Acid
N-Cyanomethylimino-Diacetic Acid
Adenosine Diphosphate
N-Carbethoxy-β-Aminoethylimino-Diacetic Acid
Tri-Polyphosphoric Acid
Citric Acid
N-Methylthioethylimino-Diacetic Acid
Tri-Metaphosphoric Acid
8-Hydroxyquinoline-5-Sulfonic Acid
Adenosine Triphosphate
N-Methyl-Imino-Diacetic Acid
N-Acetamidoimino-Diacetic Acid
β-Aminoethylsulfonic Acid-N,N-Diacetic Acid
1,4-Diaminocyclohexane-N,N-Tetracetic Acid
N-Methoxyethylimino-Diacetic Acid
Ethylenediamine-N,N-Diacetic Acid
1,3-Diaminocyclohexane-N,N-Tetracetic Acid
β-Mercaptoethylimino-Diacetic Acid
Tetra-Metaphosphoric Acid
Nitrilo Propionic Diacetic Acid
Tetramethylenediamine-Tetraacetic Acid
2-Aminobenzoic Acid-N,N-Diacetic Acid
N-(2-Hydroxyethyl)ethylenediaminetriacetic Acid
β-Aminoethylphosphonic Acid-N,N-Diacetic Acid
N,N-Dihydroxyethylethylenediamine-Diacetic Acid
Ethylenediamine-Tetra(Methylenephosphonic) Acid
Nitrilo Triacetic Acid
N-Benzylethylenediamine-Triacetic Acid
Trimethylenediamine-Tetraacetic Acid
Aminomethylphosphonic Acid-N,N-Diacetic Acid
Diethylenetriamine-Pentaacetic Acid
Ethylene Diamine Tetra Acetic Acid
1,2-Bis(2(Dicarboxymethyl)Aminoethoxy) Ethane
1,2-Diaminocyclohexane-N,N-Tetraacetic Acid EDTA is a particularly preferred chelating agent. It is effective to prevent premature hydrolysis of the precursors of the present invention in concentrations of about 0.002 to about 0.016 moles per liter of the acidic aqueous solution.

The concentration of chelating agent is preferably between about 0.004 and about 0.008 moles per liter of acidic aqueous solution.

Precursors of the present invention include, but are not limited to amides and ureas.

Urea, for example, hydrolyses to form an ammonium carbonate-bicarbonate-carbon dioxide buffer system according to the following reactions.

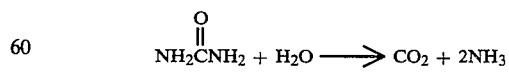

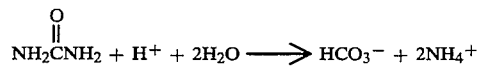

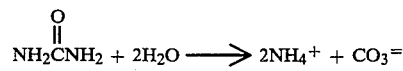

Solutions buffered with hydrolyzed urea typically have pH's of about 7 to 8.

Formamide hydrolyses to form ammonium acetate according to the following reaction.

Solutions buffered with hydrolyzed acetamide typically have pH's of about 4 to 5.

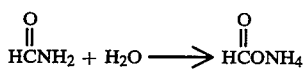

Dimethyl formamide hydrolyzes according to the following reaction.

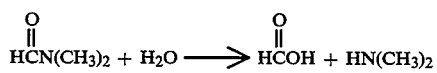

The hydrolysis rate of these precursors is temperature dependent. The temperature of the formation and the time delay desired before deposition of the inhibitor will be considered when selecting the precursor. The pH at which the hydrolysis products buffer solution with strong acids is preferably selected so as to provide a solution with a low solubility of the metal salt of the inhibitor. This minimizes the amount of inhibitor which is utilized in the initial acidic solution and not deposited within the formation.

The amount of preferred precursor will depend upon the amount of acid utilized to lower the pH of the aqueous solution, the time desired for changing the pH, the concentration of chelating agent, and the downhole conditions. Typically, between about 1 and about 15 moles of precursor will be required for each mole of acid used to lower the pH of the aqueous solution. This will generally be about a 0.1 to a 1.5 molar concentration of precursor.

Mixtures of precursors can be utilized to arrive at preferred pH's after hydrolysis and hydrolysis times.

Inhibitors which are useful include, but are not limited to, anionic scale inhibitors such as polycarboxylates and organophosphorus type scale inhibitors. Preferred solubility characteristics can be achieved by use of multivalent metal salts of these inhibitors. The salts of these inhibitors typically have minimum solubilities in weakly acidic pH ranges. Thus, although they are soluble in high pH solutions, as disclosed in U.S. Pat. No. 4,357,248, they are even more soluble in very acidic solutions. Typically, at pH's below about 2, solubilities of metal salts of these inhibitors are sufficiently high.

Preferred anionic inhibitors include phosphate and phosphonate scale inhibitors. Particularly preferred inhibitors include nitrogen-containing phosphonate scale inhibiting compounds such as nitrilotri(methylene phosphonic acid) and diethylenetriaminepenta(methylene phosphonic acid). These inhibitors are available from Monsanto Chemical Company under the trade names "DEQUEST ®2000 and DEQUEST ®2060". Other suitable inhibitors include "DEQUEST ®2010", "DEQUEST ®2041", "DEQUEST ®2051" and "DEQUEST ®2054", also available from Monsanto Chemical Company.

The precursor is preferably added to the acidic aqueous solution just prior to injection into the formation. This minimizes hydrolysis prior to injection.

The pH-solubility relationship for a particular cation-inhibitor combination depends on the mole ratio of cations to the inhibitor-anions. The solubility of the calcium salt of "DEQUEST ®2060" in a solution containing 0.05 moles per liter inhibitor is shown in FIG. 1. If a solution having a pH outside of the shaded region of FIG. 1, and the pH is then adjusted to within the shaded region by, for example, hydrolysis of a base-producing precursor, the calcium salt of the inhibitor will precipitate. An initial acidic solution of the present invention would be represented by a point such as 1. As the base producing precursor hydrolyzes, the pH of the solution increases to a point such as point 2. At point 2, a considerable amount of the dissolved inhibitor will precipitate as a calcium salt. The solution will be saturated with inhibitor at a calcium concentration indicated by the edge of the shaded region, 3. As production is resumed from the wellbore, the pH of the solution will become that of the formation brine. Typically, formation brines are slightly acidic but highly buffered due to the presence of an abundance of ionic species. The formation brine will dissolve small quantities of the calcium-inhibitor salt thus providing scale inhibition to the near wellbore region of the formation and to the downhole equipment.

It should be noted from FIG. 1 that a highly acidic solution will maintain a greater amount of inhibitor in solution than the basic solutions used in the prior art. The initial solutions of the present invention can therefore contain higher concentrations of inhibitors than solutions of higher pH with pH-lowering precursors. Precipitation of a greater proportion of the inhibitor is therefore possible when the initial solutions are acidic and neutralized by basic products of hydrolysis than when the initial solution has a high pH and is neutralized by acidic products of hydrolysis.

The acidic solutions of the present invention are preferably pushed into formations by overflushing. The overflush fluids may be formation brines, or any liquids compatible with the formation and compatible with the acidic solutions being flushed into the formations. The overflush, or at least an initial portion of the overflush, may advantageously comprise additional quantities of the precursor which forms basic material upon hydrolysis. This will ensure an increase of pH in the acidic solution which mixes with the interface between the acidic solution and the overflush liquids.

After squeezing the acidic solution into the formation, and overflushing with formation brine, injection may be discontinued for a time period sufficient for hydrolysis of an amount of the precursors into basic components effective to raise the pH of the solution and cause precipitation of the metal salt of the inhibitor. During this delay, fluids would neither be produced nor injected. But the precipitation of the metal salt of the inhibitor does not require a complete cessation of injection. Injection of overflush may continue through a portion of the time period for the hydrolysis of the precursors, or even all of the time period. Precipitation of the metal salt of the inhibitor will occur as the overflush continues to push the acidic solution into the formation. Likewise, production from the wellbore may commence prior to complete precipitation of the metal salt of the inhibitor. For example, when an overflush is used, a volume about equal to the overflush may be produced prior to complete precipitation of the metal salt of the inhibitor without loss of a significant amount of precursor or inhibitor from the formation.

EXAMPLE

Scale inhibitor composition was prepared containing 0.5 moles/liter of urea, 0.1 moles/liter of calcium chloride, 1.31 volume percent of Dequest ® 2060, and sufficient hydrochloric acid to result in an initial solution pH of 2.8. Varying amounts of ethylenediaminetetraacetic acid (EDTA) were added to samples of the scale inhibitor composition. The samples were placed in bare steel pipe section and heated to at 125° F. and held for five minutes. The samples were then removed from the steel pipes placed in an oven at 150° F. This procedure is intended to simulate injection into a wellbore through a typical production string, and then aging within a formation to allow precipitation of the scale inhibitor. The time between the placement of the samples in the oven at 150° F. and the initial precipitation of the scale inhibitor was measured, and is shown below in Table 1.

TABLE 1

| Sample | EDTA (Moles/Liter) | Hours to Initial Precipitation |
|---|---|---|
| 1 | 0 | 0.5 |
| 2 | 0.004 | 3.75 |
| 3 | 0.004 | 3.75 |
| 4 | 0.008 | 7.5 |

From Table 1 it can be seen that without a chelating agent such as EDTA, the precipitation begins after about one half of an hour. One half of an hour is, in many instances, not enough time for an inhibitor squeeze injection composition to pass through a production tubing and enter the formation. Precipitation of the scale inhibitor within the production tubing not only prevents the inhibitor from treating the near-wellbore formation, but can plug the wellbore facilities.

The foregoing description of the invention is explanatory of the invention and various changes in details of the described invention may be made within the scope of the following claims.

We claim:

1. A process to emplace a scale inhibitor within a brine containing subterranean formation in the vicinity of a producing wellbore comprising:
   providing an acidic aqueous solution comprising a dissolved scale inhibitor and a metal cation which combination is slightly soluble in the formation brine, a precursor which is capable of reacting within the formation to become a basic component and a chelating agent in an amount effective to prevent decomposition of the precursor upon contact with steel tubulars;
   injecting the acidic aqueous solution into the formation through the wellbore; and
   producing formation fluids from the wellbore after the precursor has generated an amount of basic material sufficient to cause an amount of the scale inhibitor and metal cation to precipitate within the formation that is effective to provide scale inhibition.

2. The process of claim 1 wherein the chelating agent is ethylenediaminetetraacetic acid.

3. The process of claim 2 wherein the concentration of ethylenediaminetetraacetic acid in the acidic solution is between about 0.002 and about 0.016 moles/liter.

4. The process of claim 3 wherein the amide is urea.

5. The process of claim 4 wherein the injection of the overflush fluid is following by a period when fluids are neither injected nor produced for the wellbore.

6. The process of claim 3 wherein the amide is formamide.

7. The process of claim 3 wherein the amide is dimethyl formamide.

8. The process of claim 1 wherein the chelating agent is selected from the group consisting of ethylenediaminetetraacetic acid (EDTA), nitriloacetic Acid, and Citric Acid.

9. The process of claim 1 wherein the inhibitor comprises nitrilotri(methylene phosphonic acid).

10. The process of claim 1 wherein the precursor is an amide.

11. The process of claim 1 wherein the injection of the acidic aqueous solution into the formation is followed by injection of an overflush fluid into the formation.

12. The process of claim 1 wherein the inhibitor comprises diethylenetriaminepenta(methylene phosphonic acid).

13. The process of claim 1 wherein the inhibitor comprises a nitrogen containing phosphonate.

14. The process of claim 1 wherein the precursor comprises urea.

15. The process of claim 14 wherein the inhibitor comprises a nitrogen containing phosphonate.

16. The process of claim 14 wherein the chelating agent is selected from the group consisting of ethylenediaminetetraacetic acid (EDTA), nitriloacetic Acid, and Citric Acid.

17. The process of claim 14 wherein the chelating agent is ethylenediaminetetraacetic acid in a concentration of between about 0.004 and about 0.008 moles per liter.

* * * * *